March 25, 1930.  F. A. SWEET  1,751,770
TRANSMISSION MECHANISM
Filed May 2, 1928   3 Sheets-Sheet 1
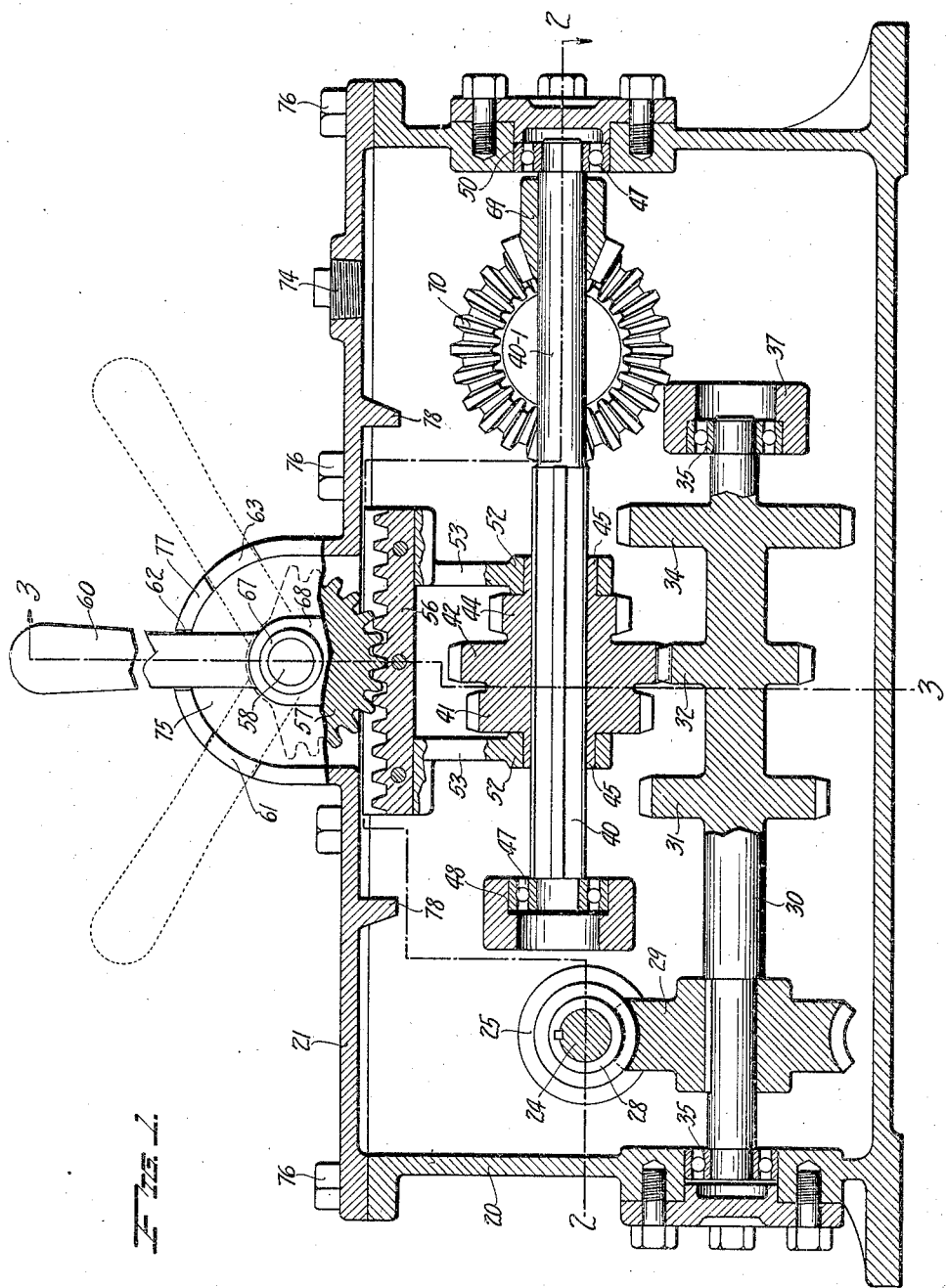
INVENTOR
F. A. SWEET,
BY
H. Mallinckrodt.
ATTORNEY March 25, 1930.  F. A. SWEET  1,751,770
TRANSMISSION MECHANISM
Filed May 2, 1928   3 Sheets-Sheet 2
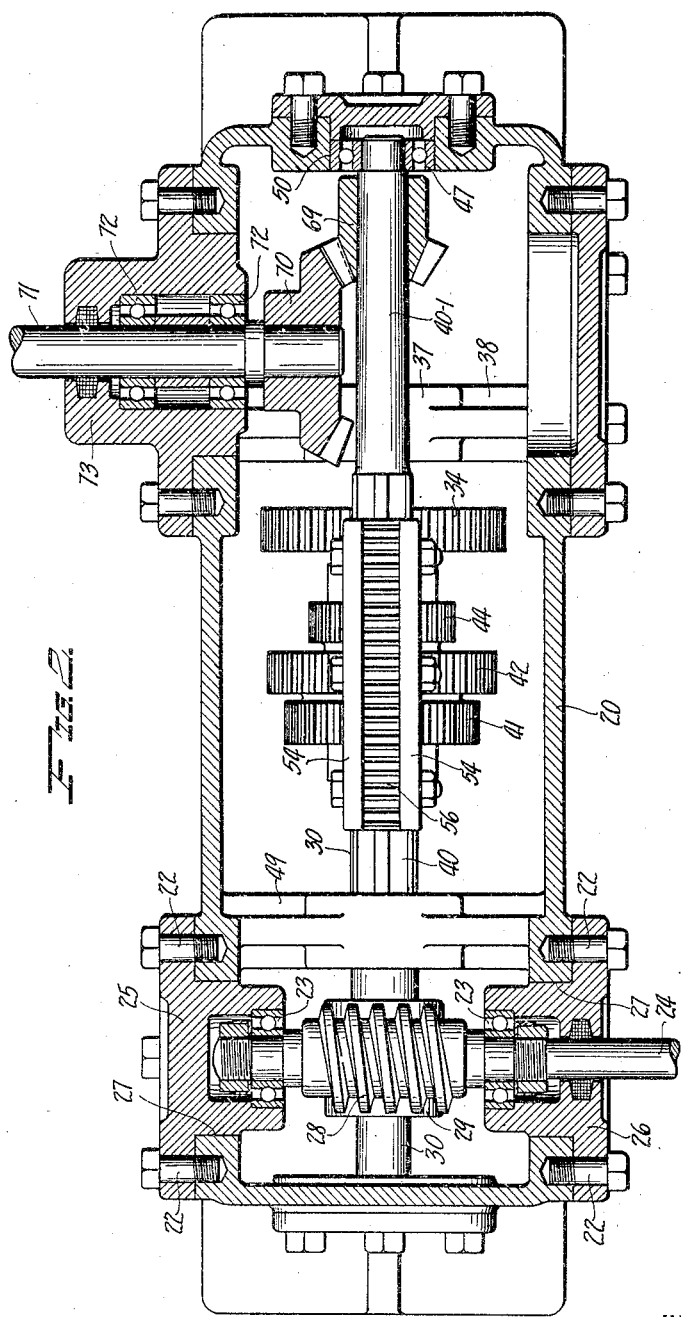
INVENTOR
F. A. SWEET,
BY
ATTORNEY

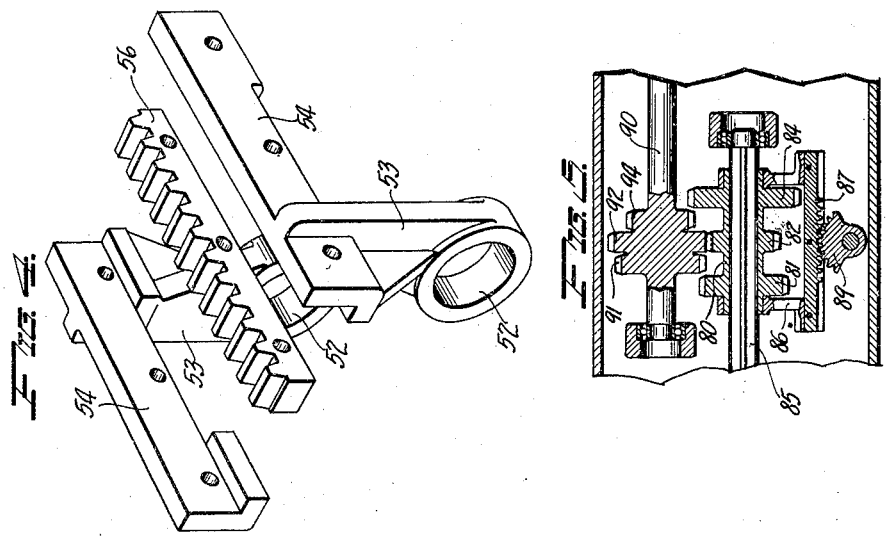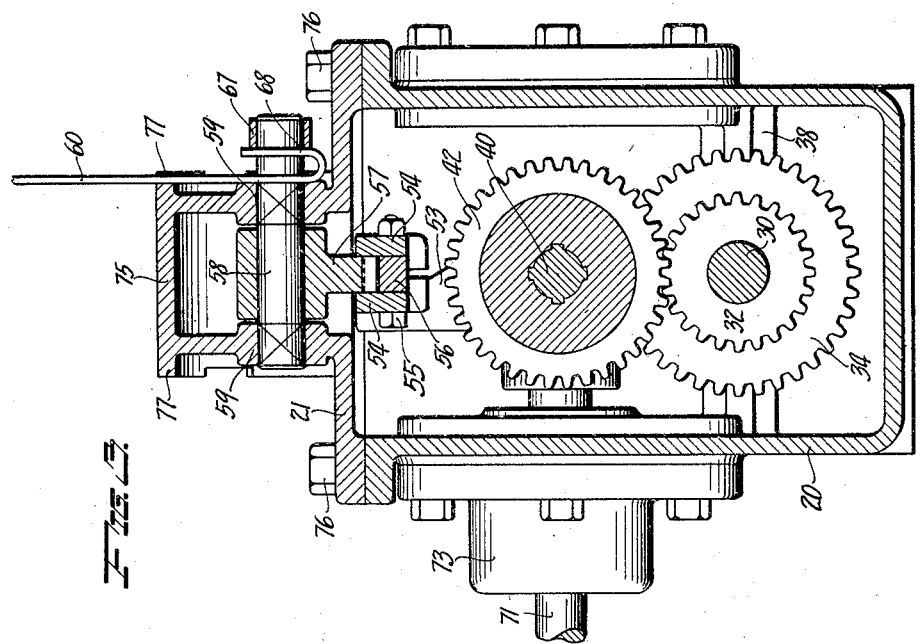

Patented Mar. 25, 1930

1,751,770

UNITED STATES PATENT OFFICE

FREDERICK A. SWEET, OF SALT LAKE CITY, UTAH

TRANSMISSION MECHANISM

Application filed May 2, 1928. Serial No. 274,516.

This invention relates to an improved transmission mechanism, and its principal objects are to provide:

First, a simple and efficient device for transmitting rotary motion from one shaft to another, while at the same time transforming the relative speeds of rotation.

Second, a device which shall be easy running, conveniently manipulated, and have all working parts accessible.

Third, one which possesses great flexibility of design, so that the axes of rotation of the incoming power shaft and the outgoing power shaft may extend in either the same general direction, or that they may be placed at right angles to each other.

Fourth, one which shall be susceptible of economical manufacture.

Fifth, one which is adapted to have various gears easily removed and others inserted, when change speed ratios other than those originally provided for, are desired.

In accomplishing these objects, I do away with the jack shafts and gears ordinarily employed in transmission mechanisms, and confine myself to two principal change shafts, one carrying a group of gears fixed relatively to each other, and the other shaft carrying a second group of gears which are fixed relatively to each other, but movable axially in relation to the first-mentioned group, the two groups meshing with each other in varying ratios.

This transmission mechanism is particularly suited for use in connection with slow moving machinery, such as furnace stokers, though not restricted thereto. When so used, it is desirable to provide for a speed reduction at one or both the incoming power and outgoing power ends of the device.

While the change shafts are always parallel to each other, either one or both the incoming and outgoing power shafts may be placed at right angles with the change shafts.

If the ratio of speed reduction desired, is not high, the two change shafts themselves may constitute respectively, the incoming and outgoing power shafts, thereby making a very simple unit.

The features of this invention, for which the protection of Letters Patent is desired, are collectively grouped in the claims concluding this specification.

In the drawings, which illustrate merely one embodiment of this invention,

Fig. 1 represents a longitudinal vertical section, parts in elevation;

Fig. 2, a horizontal section substantially along line 2—2, Fig. 1;

Fig. 3, a vertical cross-section on line 3—3, Fig. 1;

Fig. 4, an exploded view in perspective, showing various detailed parts detached from the main structure; and Fig. 5, a fragmentary section, reduced in scale, of a modification.

Referring to the drawings, the numeral 20 indicates a casing or housing which may be made of cast metal, and be provided with the cover 21. In the present instance, the power is applied to shaft 24, carried preferably in ball bearings 23, and on which may be mounted the worm 28, the ball bearings being supported in the removable, flanged thimble caps 25 and 26, respectively. These caps preferably have the accurately defined supporting necks 27 fitted into the corresponding openings in the housing, being held in place by cap screws 22.

Meshing with the worm is the worm wheel 29, the latter rigidly mounted on the shaft 30, and carrying the gears 31, 32 and 34, which are preferably integral with the shaft 30. The shaft 30 may be rotatably carried in the ball bearings 35, these being mounted respectively, in the opening defined in the casing 20, and in the opening defined in the hub 37 of the bridge or cross-arm 38, the arm being preferably an integral part of the housing.

A cluster of gears 41, 42 and 44, preferably integral with and closely adjacent each other, is provided with hubs 45, the cluster being slidably mounted on the splined shaft 40. This shaft is rotatably carried in the ball bearings 47, which latter are mounted respectively, in the accurately located opening 48 defined in the bridge arm 49, and the opening 50 defined in the housing. The hubs 45 of the gear cluster are rotatably mounted in the bearings 52 defined in the depending arms or hangers 53, these hangers forming integral parts of the beams 54 which are fastened together against the interposed rack 56. It will be observed that the two beams with their depending arms, are similar and complementary to each other, but placed in mutually reversed positions, and that the hubs of the cluster gears are inserted in the bearings 52, this being done while assembling the beams and the rack.

In the finished assemblage, the gear cluster, in the working position on the splines of the shaft 40, is slidable back and forth, so that at one time, gear 42 shall be in mesh with gear 32; at another time, the cluster is moved so that gears 42 and 32 are separated, and gears 41 and 31 shall come into mesh; at still another time, gears 42 and 32 are separated in the opposite direction, so that gears 44 and 34 shall come into mesh with each other. The movement of the cluster along the shaft 40 is accomplished by means of the rack 56 meshing with the oscillating control gear 57, which latter is rigidly mounted on the shaft 58 journaled in the bearings 59. The beams 54 project beyond the top of the rack teeth, shrouding them and together, forming a guide engaging both sides of the gear 57, thereby keeping the carriage in vertical alignment. Stops 78 limit the travel of the carriage in both directions.

In order that the control gear may be oscillated, a spring lever 60 is fixed on the protruding end of the shaft 58 and secured by the collar 67, as shown in Fig. 3. The lower end 68 of the lever is bent around so as to form the other leg of a U, thus giving the lever more ample spring motion, whereby it can readily be pulled out of, or snapped into, the successive notches 61, 62 and 63, defined in the semi-circular flanges projecting from the enclosure 75 superposed on cover 21, so as to hold the gear cluster successively in mesh with the respective gears 31, 32 or 34. Inasmuch as a flange 77 is located on both sides of the enclosure, right or left construction is provided for.

On the portion 40¹ of the shaft 40, may be keyed the bevel pinion 69 meshing with the bevel gear 70, the latter keyed on the shaft 71, which may be carried in the ball bearings 72 mounted in the thimble cap 73. From the shaft 71, motion may be transmitted to any desired mechanism.

It is to be noted that the control gear with its appurtenances, is located on the cover 21, which is removably fastened to the housing by means of cap screws 76. Therefore, when the cover is lifted off, the control mechanism is disassembled without further effort, and the remaining mechanism is left conveniently accessible.

The housing 20 should be oil-tight, so that the gears may run submerged in a bath of oil, oil being poured into the housing through the opening normally closed by threaded plug 74.

As a modification, the lower group of gears 31, 32 and 34 may be movable axially, and the gear cluster above, may be stationary axially. Such a modified construction is shown in Fig. 5, where gears 81, 82 and 84 are the counterparts of gears 31, 32 and 34, and gears 91, 92 and 94 are the counterparts of gears 41, 42 and 44. The group 81, 82 and 84 may be integral with the sleeve 80 and be movable longitudinally along the splined shaft 85. This group is rotatable in the carriage 86, which has the rack portion 87 meshing with the oscillating gear 89.

The group 91, 92 and 94 may be integral with the shaft 90, the latter being stationary longitudinally. The shifting gears 81, 82 and 84 mesh respectively with the stationary gears 91, 92 and 94 and it will be observed that it is only necessary to move the shifting gears a trifle more than the width of one gear face in order to effect a change of speed, whereas, in the construction shown in Fig. 1, the shifting gears are moved a little more than twice the width of one gear face in order to effect a similar change.

While a specific embodiment of this invention is herein shown and described, it is to be clearly understood that all the detailed parts thereof, may or may not be shown in the preferred forms, and further, that the preferred forms may be varied from time to time. Therefore, that which forms an essential and characteristic part of this invention, will be readily discernible from the claims in which its spirit is broadly generalized.

Having fully described my invention what I claim is:

1. In a transmission mechanism, a group of gears rotatably mounted in axial alignment with and spaced apart from each other, a gear cluster movable axially along said group, a carriage in which said cluster is rotatably mounted, said carriage including two mutually reversed complementary parts having journals therein, and means for moving said carriage back and forth.

2. In a transmission mechanism, a group of gears rotatably mounted in axial alignment with and spaced apart from each other, a gear cluster movable axially along said group, a carriage in which said cluster is rotatably mounted, said carriage including two mutually reversed complementary parts having journals therein, a rack portion held between said complementary parts on said carriage, a rotatable gear engaging said rack portion, and means whereby said gear is rotated.

3. A group of gears rotatably mounted in fixed axial alignment with one another, the members of said group being closely adjacent one another, a second group of gears rotatably mounted in fixed alignment with one another, the members of said second group being spaced apart from one another a distance somewhat greater than the distance across two members of the first group, hubs extending on both sides of the first group, a carriage including two mutually reversed complementary parts having hangers in which said hubs are journaled, and means for reciprocating said carriage.

4. In a transmission mechanism, a reciprocating carriage comprising a beam, a hanger depending from said beam, a second beam spaced transversely apart from the first beam, a hanger depending from said second beam, a gear cluster having hubs projecting from both sides thereof, said hubs being journaled in said hangers, a rack between said beams and an oscillating gear meshing with said rack.

5. In a transmission mechanism, a gear cluster, hubs projecting from both sides of said cluster, bearings in which said hubs are journaled, hangers supporting said bearings, beams supporting said hangers, said hangers adjacent opposite ends of said beams, said beams offset from the vertical axial plane of said bearings, a rack between said beams and a gear engaging said rack.

6. In a transmission mechanism, a shift gear carriage comprising two similar sections spaced apart transversely in reversed relation to each other, each section comprising a beam, a bearing depending from said beam, a rack between said carriage sections, and a control gear engaging said rack.

7. In a transmission mechanism, a shaft carrying a group of gears, an outside bearing at one end and an inside bearing at the other end of said shaft; a second shaft carrying a second group of gears, certain of said second gears meshing with respective gears of the said first group, a second outside bearing at one end and a second inside bearing at the other end of said second shaft; the said first outside and said second outside bearings located at opposite extremes from each other, the said first inside and said second inside bearings spaced apart from each other axially along said gear groups so that the second inside bearing shall be nearest the first outside bearing and the first inside bearing nearest the second outside bearing; and means for shifting one of said gear groups relative to the other gear group.

8. In a transmission mechanism, a shaft carrying a group of gears, an outside bearing at one end and an inside bearing at the other end of said shaft; a second shaft carrying a second group of gears, certain of said second gears meshing with respective gears of the said first group, a second outside bearing at one end, and a second inside bearing at the other end of said second shaft; the said first outside and said second outside bearings located at opposite extremes from each other, the said first inside and said second inside bearings spaced apart from each other axially along said gear groups to accommodate the said two gear groups between the nearest axially transverse planes of said inside bearings; and a worm gear drive for one of said shafts, said worm gear drive located between the outside bearing of this shaft and the inside bearing of the other shaft.

9. In a transmission mechanism, a housing, a group of gears rotatably mounted in axial alignment with one another within said housing, a second group of gears movable axially along the said first group, a carriage in which said second group is journaled, said carriage including two mutually reversed complementary parts having hangers supporting journals and a rack portion between said complementary parts, a cover for said housing, and a control gear operably mounted on said cover, said control gear meshing with said rack portion.

10. In a transmission mechanism, a housing, a group of gears rotatably mounted in axial alignment with one another within said housing, a second group of gears movable axially along the said first group, a carriage in which said second group is rotatably mounted, a cover for said housing, and shifting means engaging said carriage; said shifting means operably mounted on said cover and disengaged from said carriage when said cover is removed from said housing.

In testimony whereof, I sign my name hereto.

FREDERICK A. SWEET.